Oct. 20, 1964  W. S. KOON  3,153,399
ANIMAL HEAD RESTRAINER
Filed Jan. 18, 1963  3 Sheets-Sheet 1

INVENTOR
William S. Koon
BY
ATTORNEY

Oct. 20, 1964 W. S. KOON 3,153,399
ANIMAL HEAD RESTRAINER
Filed Jan. 18, 1963 3 Sheets-Sheet 2

INVENTOR
William S. Koon

BY *Edward Kelly*

ATTORNEY

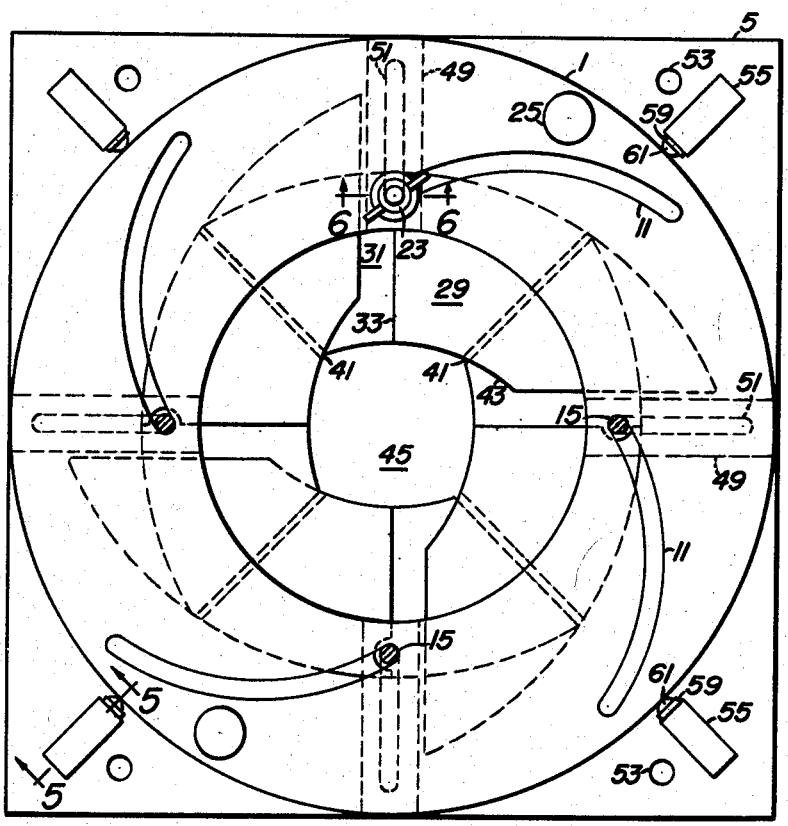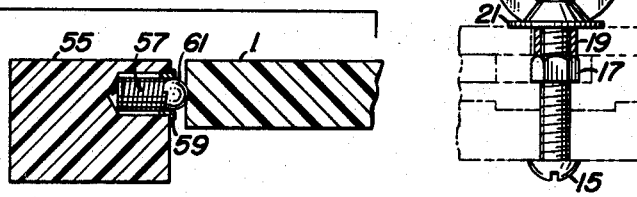
INVENTOR
William S. Koon
BY Edward J. Kelly
ATTORNEY

United States Patent Office 3,153,399
Patented Oct. 20, 1964

3,153,399
ANIMAL HEAD RESTRAINER
William S. Koon, Joppa, Md., assignor to the United States of America as represented by the Secretary of the Army
Filed Jan. 18, 1963, Ser. No. 252,535
4 Claims. (Cl. 119—96)
(Granted under Title 35, U.S. Code (1952), sec. 266)

The invention described herein may be manufactured and used by or for the Government of the United States of America for governmental purposes without the payment to me of any royalty thereon.

This invention relates to improvements in an animal head restraining device and more particularly, to a head restraining device which is designed to accommodate various neck sizes of various animals.

In the course of laboratory experiments involving the use of animals it is essential that the heads of the animals be held in a fixed position for extended periods of time. Because of the variation in sizes of the neck of animals of the same and different species it has been very difficult to obtain a fit which would positively prevent the animal from withdrawing its head during an experiment. My invention solves the problem of fit because it makes possible the application of a head restraining device having a neck opening which is adjustable over a wide range of sizes.

My head restraining device is a definite improvement over the head stocks previously used to restrain animals, see for example Patent No. 1,812,900. The old restrainer consisting of two flat boards grooved so as to slide up and down for size adjustments. Each board had a cutout portion to form a neck opening when the boards were moved together. The stock was limited in size adjustment. Also, it was uncomfortable to the animal since the neck opening was a poor fit. Furthermore, it was not a positive restrainer. Several animals were able to withdraw their heads out of the stock and consequently the value of the experiment was lost.

My animal head restrainer not only affords a wide range of size adjustments, but it is rapid and easy to manipulate. It has a neck opening conforming nearly to a circle which gives greater comfort to the animal. Furthermore, it gives positive insurance against withdrawal of the animal's head during an experimental procedure.

Further advantages of the invention will become apparent from the following description of a preferred embodiment thereof as illustrated in the accompanying drawings wherein:

FIG. 4 is a front elevation of the restraining device as viewed in a closed position.

FIG. 5 is a sectional view of a guide block and a sectional fragmentary view of an upper rim taken through 5—5 showing the related positions thereof.

FIG. 6 is a sectional view taken through 6—6 showing a locking screw assembly.

Figure 1:
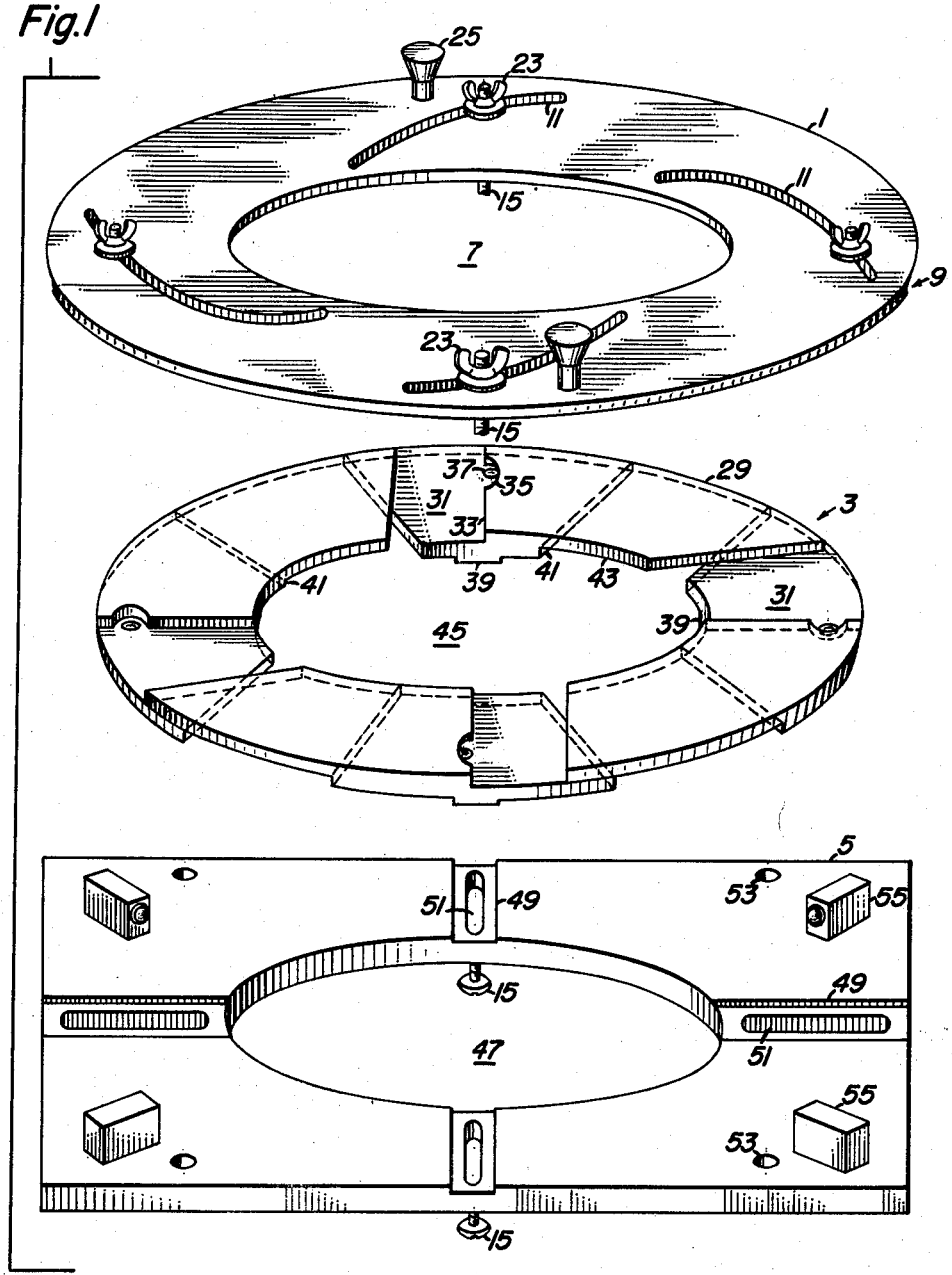
FIG. 1 is an exploded perspective view of my invention.

Referring to the drawings, the improved animal restraining device generally made of plastic (but other material such as metal may be used) comprises, a substantially round rotatable upper plate or flat ring 1, a plurality of stepped circular ring sectors generally shown at 3, and a substantially square base plate 5. The ring sectors 3 can vary in number from three to six with four being the preferred number. Obviously, the highest number of ring sectors will produce the best circular fit on the neck of the animal (see FIG. 6). The base plate 5 can be also round or polygonal, which ever is the most convenient. The plate 1, having an opening 7, has its outer edge grooved (as shown at 9) to engage a plurality of ball bearings (an example of this embodiment is shown in FIG. 5). The size of the opening 7 in the plate 1 is determined or depends upon the size of the head of the animal to be restrained. The plate 1 around its periphery has a plurality of evenly spaced arcuate slots 11 each containing a locking screw assembly (generally shown in FIG. 6). This locking screw assembly consists of a screw 15, retainer nut 17, roller 19, washer 21, and a wing nut 23. The plate 1 is further provided with a pair of knobs 25. The knobs are adapted as means for the rotation of the plate 1.

The stepped circular ring sectors generally shown at 3 are all identical and for this reason only one, the sector 29 will be described.

The sector 29 on the upper surface has an underlapping section 31 and an adjacent radial abutment step 33 with a semi round cutout 35. The purpose of the cutout 35 is to clear a hole 37 which penetrates the sector. The sector has on the lower surface an engaging key 39 and a radial aboutment step 41 with an adjacent overlapping section 43. The general thickness of the sector 29 is substantially the same as that of the plate 1. The width of the sector, i.e. the difference between the outside radius and the inside radius, is the same as that of the plate 1. The sectors are so designed that in operation (which will later be described) they open and close similar to an iris of a camera. This action enlarges or contracts the central opening 45.

Figure 2:
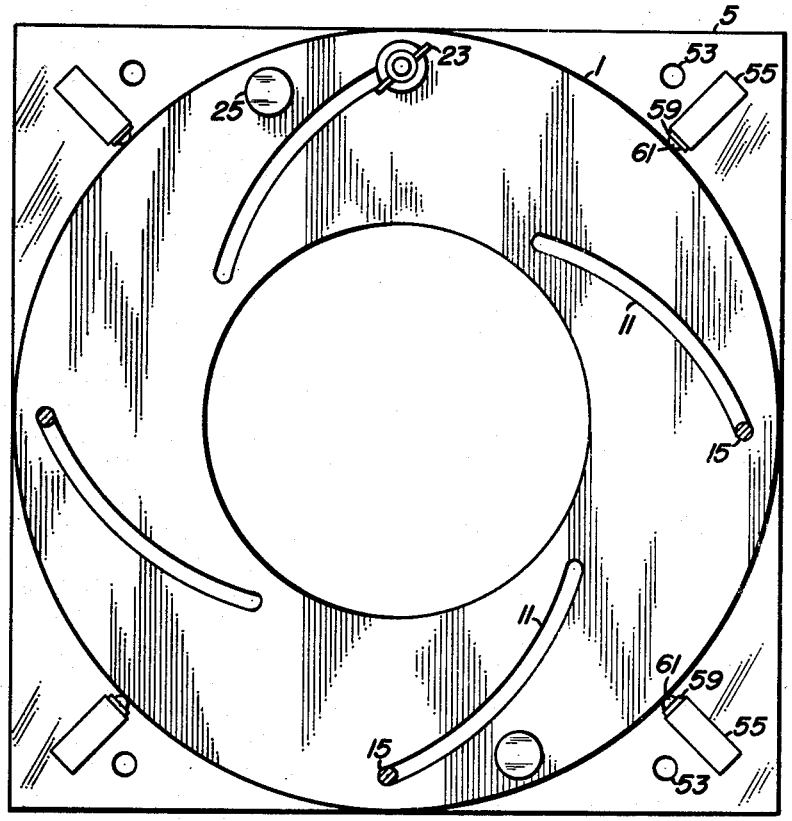
FIG. 2 is a front elevation of the restraining device as viewed in open position.
Figure 3:
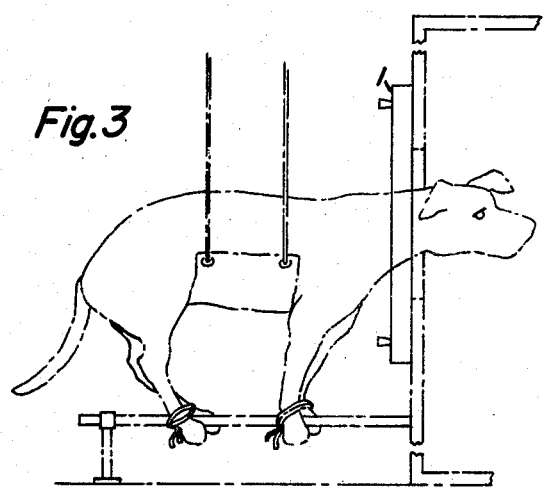
FIG. 3 is a diagrammatic edgewise view of the animal restrainer showing the device positioned about the neck of an animal.

The square base plate 5 being approximately of the same size as the outer diameter of the plate 1 (see FIGS. 2 and 4) has a central opening 47 joined with cross channels 49 each of the latter having a central elongated slot 51. The opening 47 of the base plate is of the same diameter as the opening 7 of the plate 1 and the opening 45 when the segments are in a completely open position. The square base plate 5 has located near each corner a mounting hole 53 and guide blocks 55 fastened there at an angle of approximately 45° to edge of the base plate 5. Each of these blocks (see FIG. 5) has therein an expansion spring 57, sleeve 59, and a ball bearing 61. At assembly, the plate 1, the sectors (shown at 3), and the base plate 5 are united through means of the screw 15 of the locking screw assembly (shown in FIG. 6). These screws pass through the arcuate slots 11 (in the flat ring), the holes 37 (in the segments 29), and the elongated slots 51 (in the base plate 5.) The blocks 55 are so positioned that at assembly the grooved edge of the flat ring (shown at 9) engages the ball bearing 61. The blocks 55 can be replaced by any equivalent structure such as a plurality of Z shaped brackets. The device at this stage is ready for use. It may be mounted onto a gassing chamber (as shown in FIG. 3) or to any other structure as required.

In operation, the head restraining device is brought into a closed position around the animal's neck (see Fig 3) through means of the turning action of the plate 1. In order that the operation of the device is better understood it will be described from the closed position (see FIG. 4). The four movable sectors 29 have their keys 39 engaged inside of the channels 49 of the base plate 5. The sections 31 and the sections 43 of the sectors are in an overlapping relationship. The end edges of these sections 31 are in abutment with the steps 41 of the adjacent sectors. (In order to distinctly outline each sector in FIG. 4, these end edges are not shown in a complete abutment.) The other end edges of the sectors 29 terminate near the screws 15. The operator, through means of knobs 25 rotates the plate 1 in a counter clockwise direction. This action moves the four sectors outward, the screws 15 sliding or freely travelling along arcuate slots 11. To decrease the size of the opening 45, the operator rotates the plate 1 in a clockwise direction. When the desired opening or fit around the animal's neck is obtained, the operator locks the sectors in position by tightening the wing nuts 23. The plate 1 is held in constant alignment through means of the guide blocks 55.

By suitable changes in dimensions and materials the principle of operation of this invention could be extended to include a head holder for large animals such as cattle and horses, where, for any reason, it is necessary to hold the head of the animal in fixed position, such as for the dehorning of cattle.

Although there has been described what is considered the preferred manner of carrying out the invention, it is to be understood that the same is merely illustrative and modifications may be made without departing from the scope of the invention.

I claim:
1. An animal head restrainer comprising:
 (a) flat ring-shaped radially slotted base means;
 (b) circular ring sector means, each having screw means thereon, slideably mounted in said slotted base means;
 (c) arcuately slotted flat ring means rotatably mounted over said ring sector means whereby rotary motion of said ring means is translated to tranverse motion of said ring sector means by means of said screw means riding in the arcuate slots of said flat ring means.
2. An animal head restrainer comprising:
 (a) a flat ring-shaped radially slotted base;
 (b) a plurality of circular ring sectors slideably mounted in said slotted base each of which have screw means thereon;
 (c) a rotatable, arcuately slotted, flat ring rotatably mounted over said ring sectors whereby rotary motion of said flat ring is translated to transverse motion of said ring sectors by means of said screw means riding in the arcuate slots of said flat ring.
3. An animal head restrainer comprising:
 (a) a base plate having substantially the form of a flat ring with a plurality of radial slotted channels therein, and having positioning means mounted thereon near the edges of said plate;
 (b) a plurality of stepped circular ring sectors slideably mounted on said base plate each of which have;
  (1) an integral key on the underside thereof which is adapted to give a sliding fit in said channels
  (2) a first radial step adjacent said key with an adjacent overlapping section;
  (3) a second radial step directly above said key with an adjacent underlapping section;
 whereby said ring sectors will approximate a flat ring when the overlapping section of each sector is assembled over the underlapping section of the adjacent sector
 (c) a rotatable flat ring mounted on said ring sectors within said positioning means having;
  (1) a plurality of integral arcuate camming surfaces commensurate in number with the number of said ring sectors;
  (2) handle means on the outer surface of said ring;
 (d) locking screw means mounted on said sectors extending through said base plate, said sectors and said ring, having;
  (1) roller means on said screw means in contact with said camming surfaces;
 whereby said sectors can be given a transverse movement when circular movement is given to said ring and said sectors can be locked in place with said screw means.
4. A new article of manufacture comprising:
 (a) a generally flat, stepped circular ring sector having;
  (1) a radial integral key on the underside thereof remote from the center of said ring sector
  (2) a first radial step on the same side of said key, near the center of said ring sector
  (3) a second radial step directly above said key extending in a direction opposite to said first step.

References Cited in the file of this patent
UNITED STATES PATENTS

| | | |
|---|---|---|
| 532,327 | Levy | Jan. 8, 1895 |
| 1,288,555 | Fritz | Dec. 24, 1918 |
| 3,014,456 | Shawk | Dec. 26, 1961 |